United States Patent [19]

von Allwoerden

[11] Patent Number: 4,858,418
[45] Date of Patent: Aug. 22, 1989

[54] MOWING MACHINE
[75] Inventor: Wilhelm von Allwoerden, Gailingen, Fed. Rep. of Germany
[73] Assignee: Greenland GmbH & Co. KG, Gottmadingen, Fed. Rep. of Germany
[21] Appl. No.: 148,500
[22] Filed: Jan. 26, 1988
[30] Foreign Application Priority Data
Jan. 26, 1987 [DE] Fed. Rep. of Germany ....... 3702221
[51] Int. Cl.$^4$ ...................... A01D 34/66; A01D 34/76
[52] U.S. Cl. ...................................... 56/15.5; 56/15.2; 56/13.6
[58] Field of Search .................. 56/13.6, 6, 15.2, 15.5, 56/218, 228

[56] References Cited
U.S. PATENT DOCUMENTS

| | | | |
|---|---|---|---|
| 4,187,664 | 2/1980 | Meek et al. | 56/13.6 |
| 4,428,181 | 1/1984 | Van Staveren et al. | 56/13.6 |
| 4,525,987 | 7/1985 | Werner et al. | 56/15.2 |
| 4,691,504 | 9/1987 | Glunk | 56/6 |
| 4,719,742 | 1/1988 | Ermacora et al. | 56/13.6 |

Primary Examiner—John Weiss
Attorney, Agent, or Firm—James E. Nilles

[57] ABSTRACT

A mowing machine adapted to be towed by and in laterally displaced relation to a tractor. The mowing machine has an undercarriage frame and a cross beam to which a plurality of cutting tools are mounted for rotation about vertical axex. Cutter blades are connected to the lower ends of the cutting tools. The cutting machine is connected to the tractor by means of a pivotable tractor hitch and the cutting tools are driven by a drive shaft interconnecting a power take-off shaft of the towing tractor and a gear box on the cross beam. The gear box is pivotally mounted on a middle part of the cross beam and the drive shaft is connected with the gear box by means of a support joint having forked parts pivotally interconnected on a horizontal axis.

15 Claims, 1 Drawing Sheet

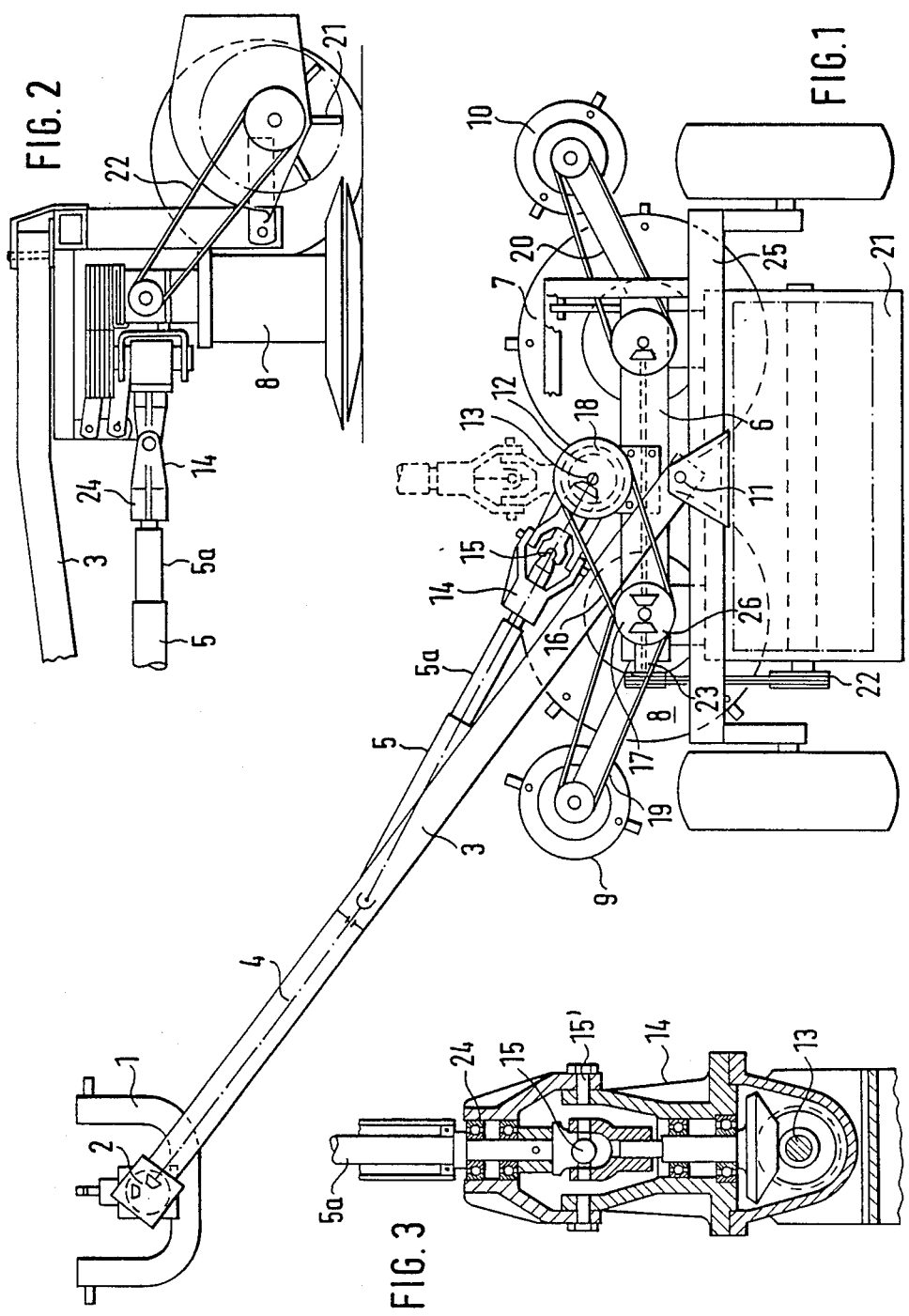

MOWING MACHINE

TECHNICAL FIELD

This invention relates to a mower of the type which operates in laterally displaced relation to the tractor to which it is attached and more particularly to a mower having an undercarriage frame and a cross beam supporting a plurality of cutting tools on substantially vertical axes of rotation with cutter blades on their underside and wherein the mower is connected to a towing tractor by means of a pivotable tractor hitch and the cutting tools are driven by a drive shaft which connects the output shaft of the tractor to the mower through a pivotable gear box.

BACKGROUND OF THE INVENTION AND PRIOR ART STATEMENT

Heretofore, cutting tools of pull type rotary mowers have been connected to an undercarriage frame in such a way that their vertical position adjusts to follow the ground level. This results in a drive train for the cutting tools which is very expensive.

In one towed mower design, the tractor hitch is connected to the pulling tractor in such a way that the mower can be swung laterally from a trail behind transport position to a laterally offset operating position. To this end, a drive shaft with universal joints is provided underneath the tractor hitch to transmit power from a tractor power take-off shaft to a gear box on the mowing machine. In this prior art design, a drive shaft universal joint is provided on the mower at a location below the pivot connection of the tractor hitch to the mower. Such a mower design is disadvantageous in that the arc of pivoting of the tractor hitch is narrowly limited, since a maximum angle of refraction for the shaft segments connected by the joint may not be exceeded. As a result, such mowers can be used only on one lateral side of the towing tractor and cannot be pivoted inward, from the lateral operating position, beyond a trail-behind transport position.

U.S. Pat. No. 2,520,107 issued Aug. 22, 1950 to W. Vutz for a Release Mechanism for Mowers shows a mower wherein a square section drive shaft is used rather than a telescoping drive shaft. The square section shaft extends through a pivoted input portion of a bevel gear box. The output shaft of the bevel gear box is connected through a universal joint to an additional intermediate shaft in order to transmit power to the mower. The intermediate shaft is connected through a universal joint to a gear box rigidly mounted on the frame of the cantilever cutter bar mower.

In this prior art mower the ability of the mower to follow the contour of the ground is limited by the cantilevered cutter bar. Even if a rotary blade or disc power were used instead of a cantilever cutter bar, an arrangement results for which the mower as a whole unit would be pivotable only together with the tractor hitch and the drive connection to the tractor for compensating for unevenness in the ground surface. And such disadvantage would still exist even if a pivotable input gear were provided, for example, on the side of the mower.

OBJECTS AND BRIEF SUMMARY OF THE INVENTION

It is an object of this invention to provide a pull-type mower which can be operated at either lateral side of the path of the towing tractor; in other words, a mower that can be selectively positioned at either lateral side of the path made by the tractor wheels, namely, to the left or to the right of a trail-behind transport position of the mower.

It is a further object of this invention to provide a mower of the type outlined in the previous object which is particularly well adapted to mow fields with uneven ground surfaces.

In achieving the foregoing objectives in a preferred embodiment of the invention a gear box is pivotally mounted substantially at a mid-portion of a cross beam and a power transmitting drive shaft is connected with the gear box by means of a forked support joint which has a horizontal axis of pivot between its two forked parts.

The drive shaft is preferably a sliding telescopic shaft disposed beneath the tractor hitch by which the tractor tows the mower.

The drive shaft may include a universal joint whose pivot point is aligned with the horizontal axis of the forked support joint and the segments of the drive shaft connected to the universal joint are coplanar with the pivot axis of the pivotable gear box. The shaft segments may be supported by bearings mounted in the forked parts of the forked support joint and the tractor hitch may be pivotally connected to the mower rearward of the pivotable gear box for swinging movement about a vertical hitch axis.

It is especially advantageous if the transmission of power to the cutting tools is achieved by means of a belt drive connecting an output shaft of the pivotable gear box with one of the inner cutting tools through use of two belt pulleys of different diameters.

In the present invention, the cross beam on which the pivotable gear box is mounted is preferably connected to the undercarriage frame by parallel linkages permitting a floating action of the cutting tools mounted on the cross beam. The horizontal pivot connection between the two parts of the forked support joint allows the drive shaft to adjust for the relative vertical movement between the cross beam and the undercarriage frame. When the tractor hitch swings horizontally relative to the undercarriage frame, the pivoted gear box on the cross beam permits the drive shaft to also swing horizontally. The tractor hitch, cross beam and pivoted gear box are so arranged that the mower can be swung to either lateral side of the towing tractor. The drive train is simpler in design than heretofore provided and is less costly to manufacture. Also, a mower of this invention is more compact in its construction.

BRIEF DESCRIPTION OF THE DRAWINGS

The invention is described in greater detail in the following detailed description of the drawings in which:

FIG. 1 is a top view of a mower incorporating one embodiment of the invention;

FIG. 2 is a side view of the mower shown in FIG. 1; and

FIG. 3 is an enlarged section view of the forked support joint of this invention.

DETAILED DESCRIPTION OF THE DRAWINGS

Referring to FIGS. 1 and 2, an attachment frame 1 is provided for connecting a mower to the rear of a towing tractor, not shown. A tractor hitch 3 is pivotally connected at its opposite ends to the attachment frame 1 and the mower undercarriage frame 25. The tractor hitch can be swung to either side of a trailing transport position to laterally offset, mower operating positions. A pivoted gear box 2 on the attachment frame 1 is driven by a tractor power take-off shaft and is drivingly connected to the mower by a fixed position shaft segment 4 and a universal jointed drive shaft 5, 5a. The mowing machine has four rotary cutters or cutting tools in the form of cutting cylinders 7, 8, 9, 10 which are arranged beneath the cross beam 6 attached by parallel links to the undercarriage frame 25. The cutting cylinders are provided at their lower ends with disc-type cutter blades which rotate on the axes of the cylinders' rotation which is generally vertical and substantially perpendicular to the ground.

The rear end of the tractor hitch 3 is hinged to the middle portion of the undercarriage frame 25 so as to pivot about a vertical hitch axis 11. A crop conditioner 21, which is driven by a belt drive 22 connected to a bevel gear unit 26 at one end of the cross beam 6, serves the purpose of treating the crop.

A gear box 12 is pivotally connected to the cross beam 6 for horizontal swinging movement about a vertical drive axis of a vertical output shaft 13 of the gear box 12. The gear box 12 is drivingly connected with the endpiece 5a of the drive shaft through use of a forked support joint 14 rotatably supporting the drive shaft. The front and rear parts of the forked support joint 14 rotatably support drive shaft parts interconnected by a universal joint. The drive shaft 5, 5a is a two-part telescoping shaft. The rear part of the forked support joint 14 is rigidly secured to the gear box 12. The pivot point 15 of the universal joint of the drive shaft is aligned with the horizontal pivot axis of the aligned pivot pins 15' interconnecting the forked parts of the joint 14. The joint 14 causes the drive shaft 5, 5a to stay in general alignment with vertical drive axis of the shaft 13. The provision of the joint 14 with its horizontal pivot axis through the pivot point 15 of the universal joint accommodates the vertical floating movement of the mowing units as they follow the ground contour.

As clearly shown in FIG. 3, the front part 24 of the forked support joint 14 includes a bearing rotatably supporting the endpiece 5a of the drive shaft. The component 5 of the drive shaft is connected by a universal joint to the shaft segment 4 which is driven by the power take-off shaft of the tractor through the pivoted bevel gear box 2.

The vertical pivot axis 11 on which the tractor hitch is pivotally connected to the undercarriage frame 25 is spaced rearwardly of the axis of vertical output shaft 13 of the gear box 12. When pivoting the tractor hitch 3 to a trail-behind transport position, an adjustment of the length of the drive shaft is necessary, which is accommodated by designing the drive shaft as a two-part telescopic shaft 5, 5a. This feature also allows the mower to be shifted between operating (mowing) positions at laterally opposite sides of the path of the towing tractor.

The gear box 12 includes a bevel gear on a rear segment of the drive shaft and a meshing bevel gear on the vertical output shaft. Power is transmitted to the rotary cutters 7, 8, 9, 10 by a belt drive including pulleys 18, 17 on the output shaft 13 and the inner cutter 8, respectively, and a drive belt 16 reeved about the pulleys 17, 187 The two belt pulleys 17, 18 are of different diameters to permit them to be interchanged to accommodate 540 rpm and 1000 rpm tractor power take-off speeds.

In FIG. 1 the mower is shown in an operating position in solid lines and broken lines forward of the gear box 12 show the drive train as it would be when the mower is in a trail-behind transport position.

As shown in the drawings, four mowing cylinders are provided, with the two inner or primary mowing cylinders 7, 8 having the same diameter including the same diameter cutting blades. The two additional or secondary mowing cylinders 9, 10 which are driven by belt drives 19, 20 have smaller diameter cutting tools. The mowing cylinder 9, which in FIG. 1 is located adjacent to the path of the tractor, has the same direction of rotation as the adjacent larger mowing cylinder 8. The other two mowing cylinders 7, 10 rotate in a direction opposite that of cylinders 8 and 9. The two outer mowing cylinders 9, 10 with lesser diameters are displaced, when the reaper is in its operating position, so their axes are spaced forward of a plane through the axes of the inner mowing cylinders 7, 8. This provides trouble-free movement of the cut crop from the outer mowing cylinders 9, 10 to the two adjacent inner mowing cylinders 8, 7 which form of swath of cut crop which is acted upon by the crop conditioner 21.

This invention readily accommodates variations in height, which commonly occur between the tractor hitch and a mower with a floating suspension, since the tractor hitch is connected to the undercarriage frame independent of the cross beam while the drive shaft and pivotable gear box are connected to the cross beam, independently of the undercarriage frame, via the forked support joint with a horizontal pivot axis.

The embodiments of the invention in which an exclusive property or privilege is claimed are defined as follows:

1. A mowing machine adapted for laterally displaced attachment to a tractor and having an undercarriage frame, a cross beam having a draft connection to said undercarriage frame, a plurality of rotary cutting tools connected for operation on vertical axes of rotation with cutting blades at their lower ends, a tractor hitch having a rear end pivotally connected to said undercarriage frame and drive means for rotating said cutting tools including a drive shaft interconnecting a power take-off shaft of the tractor with a gear box (12) on the mowing machine, characterized by the fact that said gear box (12) is pivotally mounted on a vertical drive axis to a substantially mid-point location on said cross beam (6) and said drive shaft (5, 5a) is connected to said gear box (12) by a forked support joint (14) having front and rear forked parts pivotally connected to one another on a horizontal pivot axis.

2. The mowing machine of claim 1 wherein said drive shaft is a two-piece telescoping shaft disposed beneath said tractor hitch.

3. The mowing machine of claim 2 wherein said drive shaft includes a universal joint whose pivot point is aligned with said horizontal axis of said forked support joint.

4. The mowing machine of claim 3 wherein said front part of said fork support joint includes a bearing rotatably supporting a part of said drive shaft.

5. The mowing machine of claim 4 wherein said tractor hitch is connected to said undercarriage frame (25) on a vertical pivot axis spaced rearward of the vertical drive axis.

6. The mowing machine of claim 5 wherein said gear box includes a vertical output shaft (13) disposed on said vertical drive axis and wherein said drive means includes a driving pulley (18) nonrotatably secured to said vertical output shaft, a driven pulley nonrotatably secured to one of said cutting tools and an endless drive belt (16) in power transmitting engagement with said pulleys, said pulleys being of different diameters.

7. The mowing machine of claim 1 wherein said drive shaft includes a universal joint whose pivot point is aligned with said horizontal axis of said forked support joint.

8. The mowing machine of claim 7 wherein said rear part of said fork support joint is rigidly secured to said gear box (12) and rotatably supports a rear part of said drive shaft and wherein said gear box includes a vertical output shaft (13), a first bevel gear secured to said rear part of said drive shaft and a second bevel gear meshing with said first bevel gear and secured to said vertical output shaft (13).

9. The mowing machine of claim 8 wherein said tractor hitch is pivotally connected to said undercarriage frame (25) on a vertical hitch axis (11) spaced rearwardly of said gear box.

10. The mowing machine of claim 9 wherein said drive means includes a pulley nonrotatably secured to said vertical output shaft, a driven pulley mounted coaxially on one of said rotary cutting tools and an endless belt reeved about said pulleys.

11. The mowing machine of claim 1 wherein said gear box includes a vertical output shaft disposed on said vertical drive axis, said rear part of said forked support joint is rigidly secured to said gear box and said front part of said forked support joint includes a bearing rotatably supporting said drive shaft.

12. The mowing machine of claim 11 wherein a first pair of primary rotary cutting tools are rotatably supported on said cross beam on laterally spaced vertical axes, said vertical drive axis being intermediate said laterally spaced vertical axes, a second pair of secondary rotary cutting tools are mounted on said cross bar laterally outward of said primary cutting tools, respectively, for rotation about vertical axes spaced laterally outward from said primary cutting tools and forwardly of the plane defined by said vertical axis of rotation of said primary cutting tools and wherein said drive means includes a belt and pulley drive between said vertical output shaft and at least one of said primary cutting tools and a pair of pulley drives between said primary cutting tools and said secondary cutting tools, respectively.

13. THe cutting machine of claim 1 wherein said drive shaft is a two-piece telescoping shaft disposed beneath said tractor hitch having a universal joint whose pivot point is aligned with said horizontal pivot axis, said front and rear parts of said forked support joint rotatably supporting portions of said drive shaft on opposite sides of said universal joint, said rear part of said forked support joint being rigidly secured to said gear box, said gear box including a vertical output shaft disposed on said vertical drive axis and wherein said drive means includes a bevel gear set including a first bevel gear nonrotatably secured to said vertical output shaft for rotation therewith and a second bevel gear nonrotatably secured to the portion of said drive shaft supported by said rear part of said forked support joint for rotation on an axis passing through said vertical drive axis.

14. The mowing machine of claim 13 wherein said tractor hitch is pivotally connected to said undercarriage frame on a vertical axis spaced rearward of the vertical drive axis.

15. The mowing machine of claim 1 wherein said cross beam is connected to said undercarriage frame by links permitting said rotary cutting tools mounted on said cross beam to floatingly follow the ground contour during a mowing operation.

* * * * *